(12) United States Patent
Hedgepeth et al.

(10) Patent No.: US 6,171,492 B1
(45) Date of Patent: Jan. 9, 2001

(54) FILTER FOR LIQUID FUEL

(75) Inventors: Richard E. Hedgepeth; Theodore M. Bryson, both of Fayetteville, NC (US)

(73) Assignee: Purolator Products Company, Fayetteville, NC (US)

(*) Notice: Under 35 U.S.C. 154(b), the term of this patent shall be extended for 0 days.

(21) Appl. No.: 09/244,855

(22) Filed: Feb. 4, 1999

(51) Int. Cl.[7] ............................ B01D 35/31; B01D 35/30; B01D 27/08
(52) U.S. Cl. ............................. 210/243; 210/446
(58) Field of Search .................................. 210/243, 446, 210/232

(56) References Cited

U.S. PATENT DOCUMENTS

| | | |
|---|---|---|
| 1,102,685 | 7/1914 | Proper . |
| 1,146,748 | 7/1915 | Bennett . |
| 1,623,074 | * 4/1927 | Tartrais . |
| 1,871,103 | 8/1932 | White . |
| 2,053,114 | 9/1936 | Sinks . |
| 2,065,658 | 12/1936 | Compton . |
| 2,108,759 | 2/1938 | Turman . |
| 2,138,256 | 11/1938 | Schuyler . |
| 2,152,588 | 3/1939 | Griesemer . |
| 2,263,221 | 11/1941 | Merrill . |
| 2,524,509 | 10/1950 | Barney . |
| 3,002,870 | 10/1961 | Belgarde et al. . |
| 3,004,670 | 10/1961 | Zonker . |
| 3,070,132 | 12/1962 | Sheridan . |
| 3,160,785 | 12/1964 | Munday . |
| 3,166,688 | 1/1965 | Rowand et al. . |

(List continued on next page.)

FOREIGN PATENT DOCUMENTS

| | | |
|---|---|---|
| 3434451 | * 3/1986 | (DE) . |
| 3918342 | 6/1990 | (DE) . |
| 0 176 866 | 4/1986 | (EP) . |
| 0 470 606 | 2/1992 | (EP) . |
| 745763 | * 12/1996 | (EP) . |
| 1541025 | 10/1968 | (FR) . |
| 2150936 | 1/1985 | (GB) ............................. C08J/3/21 |
| 2 279 890 | 1/1995 | (GB) . |
| 50-77878 | 7/1975 | (JP) . |
| 61-8102 | 1/1986 | (JP) . |
| 63-54859 | 4/1988 | (JP) . |

OTHER PUBLICATIONS

Shafer, et al., "Electric Currents and Potentials Resulting from The Flow of Charged Liquid Hydrocarbons through Short Pipes", Journal of Research of the National Bureau of Standards, vol. 69C, No. 4, Oct.–Dec. 1965—pp. 307–317.

"Effect of Conductivity on Charge generation in Hydrocarbon Fuels Flowing through Fiber Glass Filters", By Joseph T. Leonard & Homer W. Carhart, Journal of Colloid and Interface Science, vol. 32, No. 3, Mar. 1970, pp. 383–394, received Jul. 2, 1969 and accepted Oct. 31, 1969.

* cited by examiner

Primary Examiner—Thomas M. Lithgow
(74) Attorney, Agent, or Firm—Barnes & Thornburg

(57) ABSTRACT

An improved filter for liquid fuel housing an elongated tubular housing with a cylindrical wall and having an inlet end and an outlet end and including an integral inlet connector portion at the inlet end and an integral outlet connector portion at the outlet end and a filter element positioned within the tubular housing and having filter media defining a central passageway closed at one end, the passageway having an opposite end in communication with the housing outlet connector portion, the filter media having an external surface in communication with the housing inlet connector portion so that liquid fuel flowing through the housing flows through the filter media, the housing cylindrical wall being formed of an inner wall portion and an outer wall portion with a space therebetween providing a housing that resists static electric induced sparks passing therethrough.

10 Claims, 3 Drawing Sheets

U.S. PATENT DOCUMENTS

| | | |
|---|---|---|
| 3,186,551 | 6/1965 | Dornauf . |
| 3,231,091 | 1/1966 | Kingsbury et al. . |
| 3,233,737 | 2/1966 | Hultgren . |
| 3,295,684 | 1/1967 | Webb . |
| 3,334,747 | 8/1967 | Niccum et al. . |
| 3,361,261 | 1/1968 | Fairey et al. . |
| 3,473,087 | 10/1969 | Slade . |
| 3,520,110 | 7/1970 | Knauer . |
| 3,567,619 | 3/1971 | Brown . |
| 3,712,776 | 1/1973 | Woodham et al. . |
| 3,907,955 | 9/1975 | Viennot . |
| 3,914,002 | 10/1975 | Berliner et al. . |
| 3,929,641 | 12/1975 | Dukek . |
| 3,933,643 | 1/1976 | Colvin et al. . |
| 3,943,273 | 3/1976 | de Putter . |
| 4,005,339 | 1/1977 | Plantard . |
| 4,037,011 | 7/1977 | Hattori et al. . |
| 4,187,179 | 2/1980 | Harms . |
| 4,196,464 | 4/1980 | Russell . |
| 4,215,384 | 7/1980 | Elson . |
| 4,319,303 | 3/1982 | Thorn . |
| 4,321,136 | 3/1982 | Matsui . |
| 4,322,232 | 3/1982 | Beane . |
| 4,378,322 | 3/1983 | Atterbury et al. . |
| 4,420,396 | 12/1983 | Yamamoto et al. . |
| 4,442,819 * | 4/1984 | Veach . |
| 4,452,697 * | 6/1984 | Conrad . |
| 4,500,595 | 2/1985 | Gerteisen et al. . |
| 4,510,051 * | 4/1985 | Diry . |
| 4,540,191 | 9/1985 | Hoch . |
| 4,610,783 | 9/1986 | Hudson . |
| 4,613,922 | 9/1986 | Bachmann . |
| 4,624,779 * | 11/1986 | Hurner . |
| 4,664,971 | 5/1987 | Soens . |
| 4,675,143 | 6/1987 | Wakita et al. . |
| 4,686,071 | 8/1987 | Rosenzweig et al. . |
| 4,759,842 | 7/1988 | Frees et al. . |
| 4,788,104 | 11/1988 | Adriaensen et al. . |
| 4,806,204 | 2/1989 | Manfre et al. . |
| 4,812,247 | 3/1989 | Fahner et al. . |
| 4,853,120 | 8/1989 | Frantz . |
| 4,870,535 | 9/1989 | Matsumoto . |
| 4,906,494 | 3/1990 | Babinec et al. . |
| 4,948,515 | 8/1990 | Okumura et al. . |
| 4,979,364 | 12/1990 | Fleck . |
| 4,985,801 | 1/1991 | Hellard et al. . |
| 4,999,108 | 3/1991 | Koch et al. . |
| 5,076,920 | 12/1991 | Danowski et al. . |
| 5,081,326 | 1/1992 | Usui . |
| 5,085,773 | 2/1992 | Danowski . |
| 5,108,270 | 4/1992 | Kozumplik, Jr. . |
| 5,151,198 | 9/1992 | McCullough, Jr. et al. . |
| 5,164,084 | 11/1992 | Danowski et al. . |
| 5,164,879 | 11/1992 | Danowski et al. . |
| 5,213,882 | 5/1993 | Sassa et al. . |
| 5,380,432 | 1/1995 | Brandt . |
| 5,382,359 | 1/1995 | Brandt . |
| 5,798,048 | 8/1998 | Ries . |

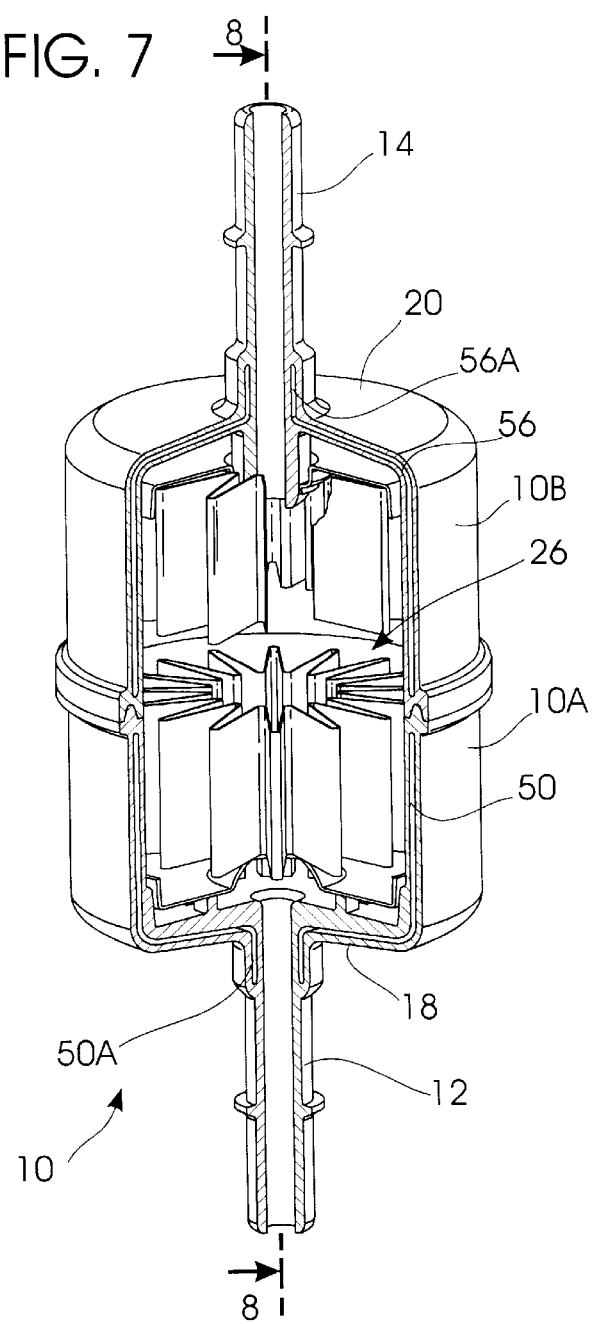
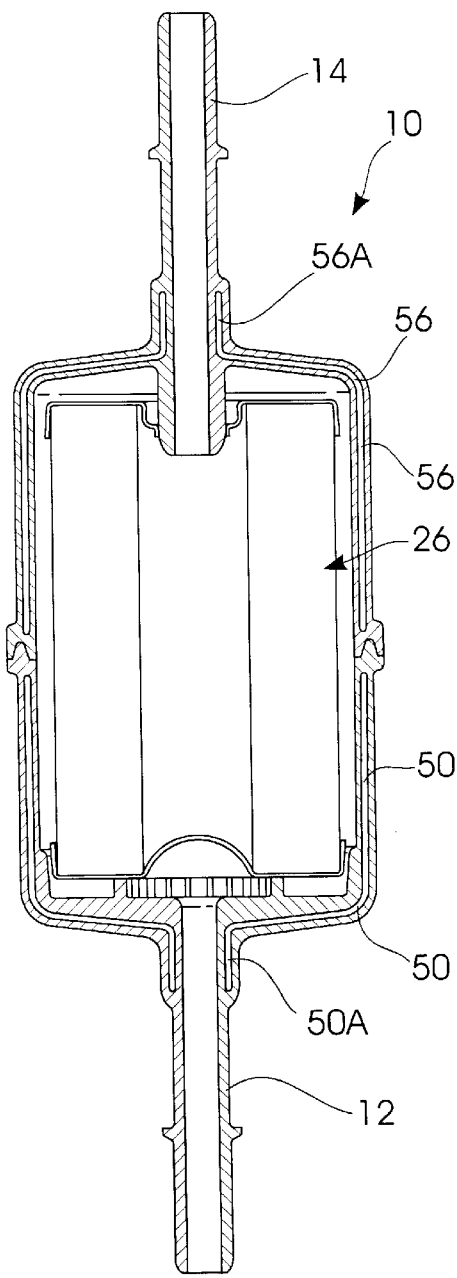
FIG. 7
FIG. 8

FILTER FOR LIQUID FUEL

CROSS-REFERENCE TO RELATED APPLICATIONS

This application is not related to any pending United States or foreign patent application, nor is it referenced in any microfiche appendix.

BACKGROUND OF THE INVENTION

Virtually all devices that consume liquid fuel include a fuel filter. The most common example of a liquid fuel filter is that used on automobile and truck engines. Fuel filters have always been important as a part of internal combustion engines since any dirt or contamination in fuel can very readily cause carburetor problems or in newer engines, fuel injector problems. Most manufacturers of internal combustion engines specify periodic replacement of fuel filters to make certain that they don't become clogged and impair engine performance and to be certain that filtration of the fuel is effective to remove solids and other contaminants.

When fuel filters were first marketed for internal combustion engines, they were typically in the form of a permanently mounted housing that could be disassembled and the filter element itself replaced. In recent years, substantially all manufacturers of internal combustion engines, and particularly manufacturers of cars and trucks, employ disposable filters in which the housings that contains the filter elements are integral and are not subject to being disassembled. That is, when it is necessary to replace a fuel filter, the entire filter housing is thrown away.

A problem which has long been known to the designers of fuel systems for automobile and truck engines is that fuel flowing through a filter can result in the accumulation of a static electricity charge. As fuel passes through a filter media the flowing fuel is stripped of electrons with the electrons collecting on the inside of the filter housing. If the fuel filter housing is metal this electrical charge is readily conducted away, but when the housing is made of a non-conductive material, such as plastic, the charge is not readily conducted away and thus a buildup of electrostatic charge can occur to the point where a static discharge can take place. When an electrostatic charge builds up in a filter that exceeds the dielectric strength of the material of which the filter body is formed a discharge can occur between the filter housing and an adjacent conductive part of the engine with which the filter is employed. A discharge through a plastic filter housing can cause a pinhole in the housing and leakage of fuel can occur. One way to reduce static electric discharges through fuel filter housings made of plastic is to increase the conductivity of the filter housings. The invention herein provides a way to reduce static discharge.

Others have attacked the problem of electrostatic discharge through plastic fuel filter housings by including conductive materials, such as fibers of stainless steel, in the plastic matrix of which the housing bodies are formed. This technique may be employed effectively in the improved filter for liquid fuels as will be described herein.

PRIOR ART

For more background information relating to fuel filters, particularly of the type that employ plastic housings, reference can be made to the following previously issued United States and foreign patents and to the listed publication referenced:

| PATENT NO. | INVENTOR | TITLE |
| --- | --- | --- |
| 3,002,870 | Belgarde et al. | Liquid Filters |
| 4,500,595 | Gerteisen et al. | Stainless Steel Fiber-Thermosplastic Granules and Molded Articles Therefrom |
| 4,664,971 | Soens | Plastic Article Containing Electrically Conductive Fibers |
| 4,675,143 | Wakita et al. | Process for Producing a Shaped Electroconductive Thermoplastic Resin Composition Article |
| 4,788,104 | Adriaensen et al. | Granular Composite Containing Crimped Fibers and Plastic Articles Made Therefrom |
| 4,812,247 | Fahner et al. | Plastics Moulding Containing Reinforced Fillings |
| 5,076,920 | Danowski et al. | Electrostatically Dissipative Fuel Filter |
| 5,085,773 | Danowski | Anti-Static Fuel Filter |
| 5,164,084 | Danowski et al. | Electrostatically Dissipative Fuel Filter |
| 5,164,879 | Danowski et al. | Electrostatically Dissipative Fuel Component |
| 5,380,432 | Brandt | Fuel Filter with Electrostatic Charge Preventing Media |
| 5,382,359 | Brandt | Plastic Fuel Filter with Conductive Coating for Providing an Evaporative Barrier and for Dissipating Electrostatic Charges |
| 5,798,048 | Ries | Multilayer Plastic Fuel Filter Having Antistatic Properties |
| 2,150,936 (Great Britain) | Lode Soens | Plastics Articles Containing Electrically Conductive Fibers |

OTHER ART

| AUTHOR | TITLE | DATE | PUBLICATION |
| --- | --- | --- | --- |
| Joseph T. Leonard & Homer W. Carhart | Effect of Conductivity on Charge Generation in Hydrocarbon Fuels Flowing through Fiber Glass Filters | Received 7/2/69 Accepted 10/31/69 | Journal of Colloid and Interface Science, Vol. 32, No. 3, March 1970, pages 383–394 |

SUMMARY OF THE INVENTION

The invention herein provides an improved filter for liquid fuel and particularly a fuel filter made of a moldable plastic, the filter being of the throw away type in which the filter element contained within the housing is not separately removable and replaceable. The fuel filter is in the form of an elongated tubular housing having a cylindrical wall and having an inlet end and an outlet end. An integral elongated tubular inlet connector portion is integrally formed with the housing inlet end. An integral elongated tubular outlet connector portion is, in the same way, integrally formed as a part of the housing outlet end. The housing cylindrical wall has an imaginary cylindrical axis and in a preferred arrangement of the filter the inlet and outlet connector portions have tubular axes that are coaxial with the housing cylindrical axis.

A filter element is positioned within the tubular housing. A typical filter element is formed of filter media that defines a central passageway that is closed at one end, the passageway having an opposite end that is in sealed communication with the housing tubular outlet connector portion. The filter media has an external circumferential surface that is in communication with the housing tubular inlet connector portion. Liquid fuel flowing into the housing through the inlet connector portion contacts the exterior circumferential surface of the filter element, passes through the filter element where any entrained solid components are intercepted and into the filter element central passageway where the fuel flows out through the housing tubular outlet connector portion.

The liquid fuel filter housing, including the opposed inlet and outlet ends, are formed in a double wall configuration having an inner wall portion and an outer wall portion with a space therebetween.

The fuel filter as described above is, by virtue of the double wall, a housing of reduced weight for preselected mechanical strength and employs a reduced quantity of plastic to achieve required structural rigidity.

Further, the double wall filter housing of this invention can, if desired, be manufactured utilizing plastic material that is inherently electrically conductive or that has electrically conductive material therein such as short length fibers of stainless steel or other conductive materials.

A better understanding of the invention will be obtained from the following description and claims, not taken in conjunction with the attached drawings.

BRIEF DESCRIPTION OF THE DRAWINGS

FIG. 7 is an isometric view, cut away as in FIG. 2, and showing an alternate embodiment of the invention in which the open space between interior and exterior housing walls extend into inlet and outlet connector portions.

FIG. 8 is a cross-sectional view of the alternate embodiment taken along the line 8—8 of FIG. 7.

DETAILED DESCRIPTION OF THE PREFERRED EMBODIMENTS

Figure 1:
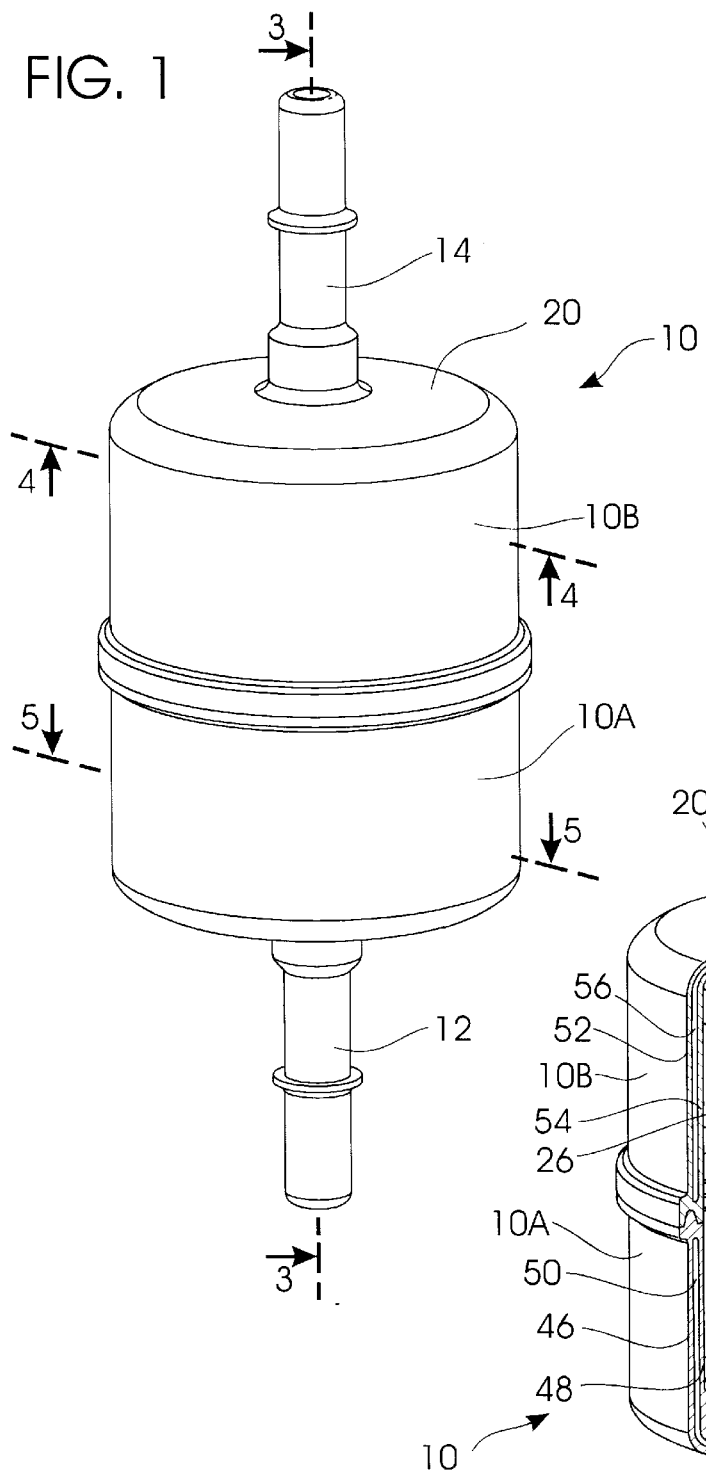
FIG. 1 is an isometric elevational view of a disposable liquid fuel filter of the type used with automobile and truck engines. The external appearance of the filter is not unlike fuel filters of on the market today.

Referring first to FIG. 1, an external view of a type of filter embodying the invention is illustrated. The filter includes a cylindrical housing generally indicated by the numeral 10 and is preferably manufactured in the form of two moldings that are welded together in a manner to be described subsequently. The housing first portion is indicated by the numeral 10A and the second portion by 10B. The first portion 10A includes an integral elongated tubular inlet connector portion 12 and housing portion 10B includes an elongated tubular outlet connector portion 14.

The filter of FIG. 1 is, when completed, an integral device and is a throw-away type filter, that is it is not a type of filter that includes a permanently used housing with a removable and replaceable filter element. When the filter 10 is to be replaced, the entire filter is removed from hoses or piping attached to inlet and outlet connector portions 12 and 14 in the typical manner in which fuel filters as commonly employed today for car or truck engines are used.

Figure 2:
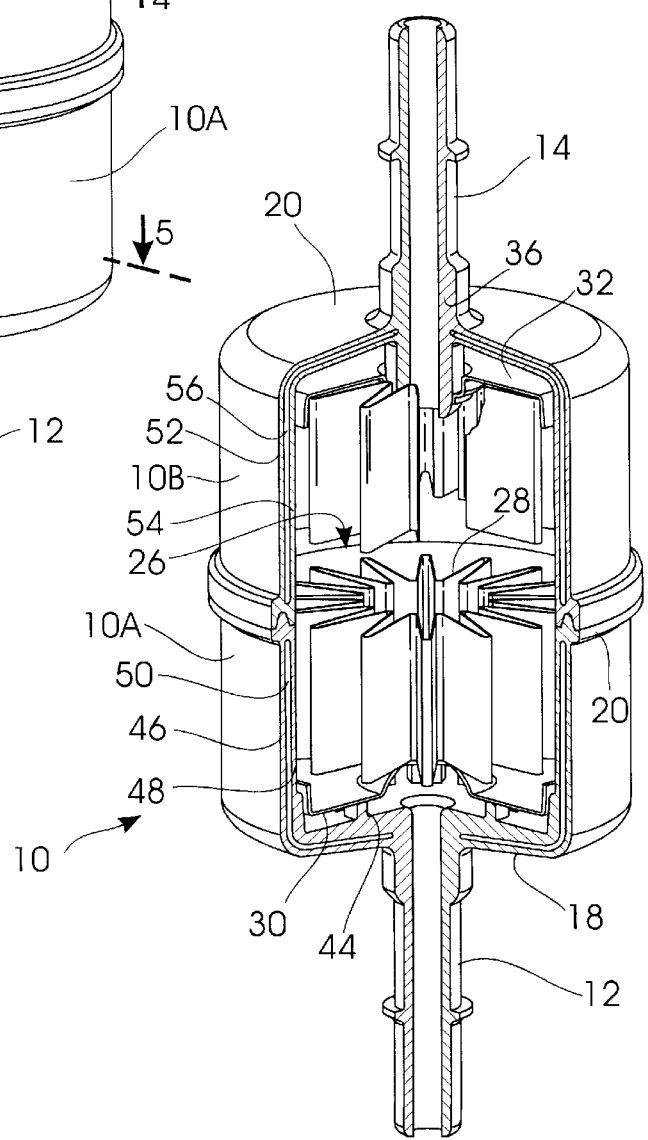
FIG. 2 is an isometric elevational cut-away view showing unique aspects of the fuel filter of FIG. 1.
Figure 3:
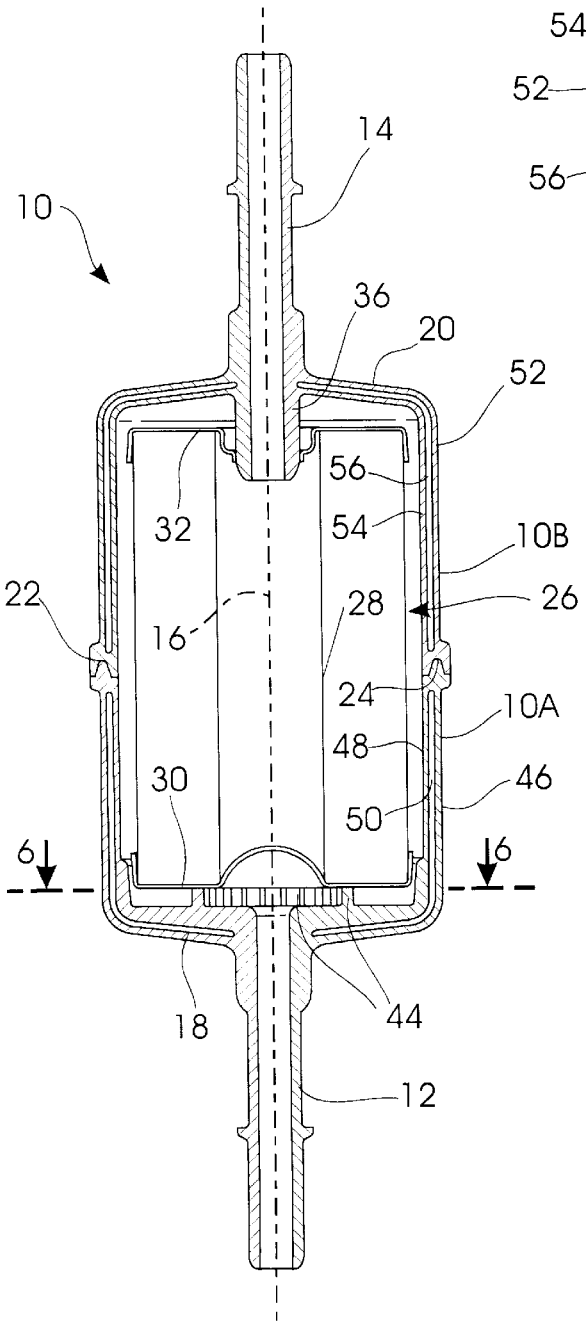
FIG. 3 is an elevational cross-sectional view taken along the line 3—3 of FIG. 1 showing details of the construction of the fuel filter.
Figure 4:
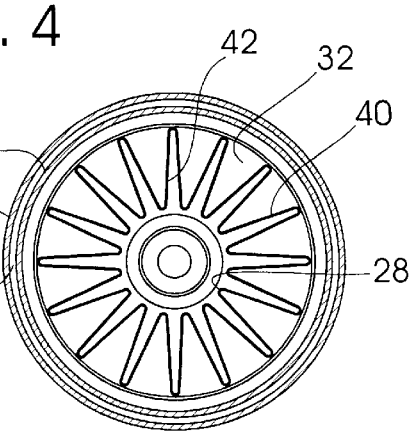
FIG. 4 is a cross-sectional view taken perpendicular to the longitudinal axis of the filter along line 4—4 of FIG. 1.
Figure 5:
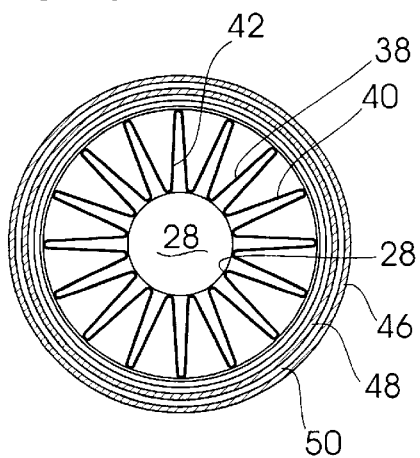
FIG. 5 is another cross-sectional view taken along the line 5—5 of FIG. 1.
Figure 6:
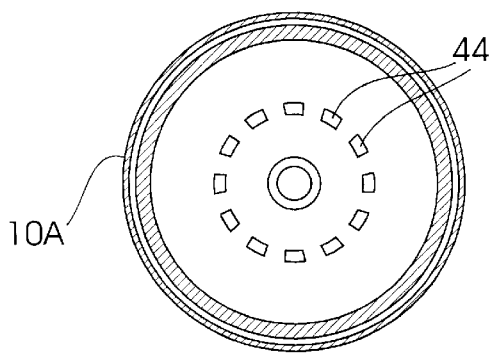
FIG. 6 is still another cross-sectional view as taken along the line 6—6 of FIG. 3.

FIGS. 2 and 3 show internal details of filter 10. Molded parts 10A and 10B are joined together to form the integral housing. The parts 10A and 10B when joined together provide a tubular housing that, in the illustrated embodiment, is symmetrical about a center axis 16 as seen in FIG. 3 and the inlet and outlet connector portions 12 and 14 are coaxially with center axis 16, however this is by example only. Connectors 12 and 14 need not be concentric with each other or with housing portions 10A and 10B. The housing formed when parts 10A and 10B are joined together provide an inlet end 18 having inlet connector portion 12 integrally formed with it and an outlet end 20 having integrally formed outlet connector portion 14.

The housing first molded portion 10A has, opposite inlet connector portion 12, a circumferential end surface 22. In like manner, housing second portion 10B has opposite to outlet connector portion 14 a circumferential end surface 24. Circumferential end surface 22 has a forwardly extending ridge shape while circumferential end surface 24 has a circumferential groove. The housing portions 10A and 10B are welded together at the circumferential end surfaces 22 and 24 to form a unitary filter housing. The method of welding portions 10A and 10B to each other can vary, such as by the use of ultrasonic welding or solvent welding depending upon the type of plastic material of which the portions are formed or by frictional welding, that is, by spinning the portions 10A and 10B relative to each other so that the circumferential surfaces 22 and 24 reach a molten state integrally joining the housing portions to each other. The invention herein is not limited to a specific method of welding the housing portions to each other.

Positioned within filter housing 10 is a filter element generally indicated by numeral 26 that performs the filtration function. The filter element 26 is elongated and tubular in shape and has a central passageway 28 that is closed at one end by a closure plate 30. The opposite end of the filter element has an end plate 32 with an opening 34 therein. Housing second portion 10B includes an integral inwardly extending tubular portion 36 that is an inward extension of outlet connector portion 14. The tubular portion 36 is sealably received within opening 34 of the filter element.

Filter element 26 can be formed in a variety of ways, but a most common way is to manufacture the element out of filter paper 38 that is pleated and formed into a tubular configuration providing central passageway 28. The pleated paper provides an outer surface 40 and an inner surface 42. Usually outer surface 40 is exposed to fluid flow inwardly through inlet connector portion 12 into the interior of housing 10. The fluid flows through pleated filter paper 38 into central passageway 28 and out through outlet connector portion 14, however the fluid flow direction can be reversed.

To provide unobstructed flow of fuel from inlet connector portion 12 into the interior of housing 14, housing inlet end 18 is provided, on its interior surface, with spaced apart upstanding posts 44 that engage closure plate 30. The spaces between posts 44 provide passageways for fluid flowing into the housing through inlet connector portion 12, or as previously stated, the flow direction could be reversed. Liquid fuel can pass through the filter only by passing through filter paper 38.

It is understood that this invention is not limited to a specific type of filter element 36. The type illustrated herein is typical of liquid fuel filters used with car and truck engines but any other filter element that provides a filter media having one surface in sealed communication with inlet connector portion 12 and an opposite surface in communication with outlet connector portion 14 would function for the intended purpose of this invention.

The filter described to this point is not unlike fuel filters for cars and trucks in use throughout the world today. However, the type of fuel filter described to this point wherein housing 10 is formed of plastic has been the source of concern due to the fact that as fuel is filtered through filter media, that is through filter paper 38, stripping of electrons takes place and electrons collect on the inside of the filter housing. This is not a significant problem if the filter housing is made of metal, since the electrostatic buildup can easily be conducted away. However, fuel filters having housings made of non-conductive plastic material, do not readily bleed off accumulated static charge. In filters with housings made of plastic, the static charge can build up and upon exceeding the dielectric strength of the housing wall, a discharge of electrical energy in the form of an electric spark can take place through the housing wall. An electrical discharge in the form of a spark is like a miniature bolt of lightning. It creates an area of intense heat that can melt a pinhole in the wall of the filter housing. Pinholes can be sufficiently large that fuel leakage can occur. Obviously, leakage of a combustible fuel out of a fuel filter housing is a source of danger in that it can result in a fire or an explosion. For this reason it is important to reduce the possibility of discharge of static electricity through the filter housing wall.

The essence of this invention is the provision of a unique housing for a liquid fuel filter, and particularly for a disposable type of liquid fuel filter as commonly employed car and truck engines. The unique housing is achieved by providing a double wall construction, that is a housing having an inner wall and an outer wall with a space therebetween. This improvement is illustrated in FIGS. 2 through 8, but not in FIG. 1 since the improvement does not require alteration of the exterior appearance of a typical liquid fuel filter. As seen specifically in FIGS. 2 and 3 housing first molded portion 10A has an outer wall 46 and an inner wall 48 with a space or void 50 therebetween.

In like manner, housing portion 10B has an outer wall 52, an inner wall 54 and a space 56 therebetween.

The provision of a double wall housing with an intermediate space has several advantages over fuel filters having plastic housings that are of unitary wall thickness. First, by providing a double wall, the physical strength and mechanical integrity of the filter housing is increased without increasing the weight of the filter or without increasing the quantity of plastic required to mold the housing portions. Putting it another way, if a given quantity or weight of plastic is available to manufacture a housing for a fuel filter, the resultant housing utilizing the invention herein having a double wall configuration will, be a stronger structure. On the other hand, a housing duplicating that obtained by a single wall thickness housing of a given strength and rigidity can be achieved using less plastic with resultant less weight by employing the double wall concept as disclosed herein.

One method that can be used to manufacture the double wall housing portions 10A and 10B uses a gas-assist injection molding process in which a gas is injected concurrently with plastic into molds to form space 50 in housing first mold portion 10A and space 56 in housing second mold portion 10B. A detailed description of gas-assist injection molding can be found in the August, 1998 edition of the magazine "Molding Systems," pages 29–44. The teachings of this publication are incorporated herein by reference. Other methods may be employed to manufacture the double wall housing portions.

Others who have worked to combat the problem of arc discharge through plastic housings of fuel filters have suggested employing a plastic formulation that is electrically conductive. Making a plastic item electrical conduction can be achieved by coating the finished component with an electrical conductive material or, the plastic used for forming the components can be made electrically conductive by the inclusion of conductive fillers. In systems of this type, the metal fibers, such as fibers of stainless steel, are mixed with the polymer material which is used for injection molding of the housing components. For examples of the use of conductive materials in the formation of fuel filter housing reference may be had to U.S. Pat. No. 5,076,920 entitled "Electrostatically Dissipative Fuel Filter."

In FIGS. 2 through 6, voids 50 and 56 in the housing portions are only in the housing cylindrical sidewalls and ends and do not extend into inlet and outlet connector portions 12 and 14. However, FIGS. 7 and 8 show an alternate embodiment in which the space 50 in housing first mold portion 10A extends into the inlet connector portion 12, the space extension being indicated by 50A. In like manner. the space 56 is extended into outlet connector portion 14, the extended space being indicated by numeral 56A. Typically, fuel is conducted to and from filter 10 by elastomeric tubing secured on inlet connector portion 12 and outlet connector portion 14. This elastomeric tubing adds increased dielectric resistance to arcing through the connector portions of the housing.

In summary, the invention herein provides an improved liquid fuel filter that is particularly applicable to disposable types of filter commonly used for cars and trucks in which improved economy and weight reduction are obtained.

The claims and the specification describe the invention presented and the terms that are employed in the claims draw their meaning from the use of such terms in the specification. The same terms employed in the prior art may be broader in meaning than specifically employed herein. Whenever there is a question between the broader definition of such terms used in the prior art and the more specific use of the terms herein; the more specific meaning is meant.

Whereas, the present invention has been described in relation to the drawings attached hereto, it should be understood that other and further modifications, apart from those shown or suggested herein, may be made within the spirit and scope of this invention.

What is claimed is:

1. An improved filter for liquid fuel comprising:
   an elongated tubular housing having a cylindrical wall defining an interior and exterior of the filter and having an inlet end and an outlet end and including an integral tubular inlet connector portion at said inlet end and an integral tubular outlet connector portion at said outlet end;
   a filter element positioned within said tubular housing and having filter media defining a central passageway closed at one end, the passageway having an opposite end in communication with said housing tubular outlet connector portion, the filter media having an external surface in communication with said housing tubular inlet connector portion whereby liquid fuel flowing through the tubular housing flows through the filter media, said housing cylindrical wall having an inner wall portion and an outer wall portion molded from a moldable material to form an open space therebetween, said outer wall sealing the open space from the exterior of said tubular housing.

2. An improved liquid fuel filter according to claim 1 wherein said housing is formed of a moldable material.

3. An improved liquid fuel filter according to claim 2 wherein said housing is formed of essentially non-electrically conductive plastic having electrically conductive material imbedded therein.

4. An improved liquid fuel filter according to claim 1 wherein said space between said housing inner and outer wall portions extend within said housing inlet and outlet ends and at least partially within each of said integral tubular inlet and outlet connector portions.

5. An improved liquid fuel filter according to claim 1 in which said housing is formed of a first and a second portion, the first housing portion having an integral elongated tubular inlet connector portion and the second housing portion housing having an integral elongated tubular outlet connector portion, the first and second housing portions being welded together, encapsulating said filter element therein.

6. An improved liquid fuel filter according to claim 5 wherein said first housing portion has a circumferential end surface opposite said inlet end having said integral tubular inlet connector portion and wherein said second housing portion has a circumferential end surface opposite said tubular outlet connector portion, said first and second housing portions being welded to each other at said circumferential end surfaces.

7. An improved filter for liquid fuel comprising:

a first housing portion having a cylindrical wall with a cylindrical axis and at one end thereof an inlet end having an integral inlet connector portion and at an opposite end thereof a circumferential end surface in a plane normal to said first housing cylindrical axis, said first housing cylindrical wall being formed of an inner wall portion and on outer wall portion cooperating to form an enclosed, open space therebetween;

a second housing portion having a cylindrical wall with a cylindrical axis and at one end thereof an outlet end having an outlet connector portion and at an opposite end thereof a circumferential end surface in a plane normal to said second housing cylindrical axis;

said second housing cylindrical wall being formed of an inner wall portion and an outer wall portion cooperating to form an enclosed, open space therebetween, each of said inner wall portions and outer wall portions being molded from a moldable material;

a filter element having a first surface and an opposed second surface, said first surface and second housing portions being coaxially joined at said circumferential end surfaces providing a housing interior encompassing said filter element, the filter element first surface being in closed communication with said inlet connector portion and the second surface in closed communication with said outlet connector portion.

8. An improved liquid fuel filter according to claim 7 wherein each of said first and second housing portions is formed of electrically conductive material.

9. An improved liquid fuel filter according to claim 8 wherein each of said first and second housing portions is formed of essentially non-electrically conductive plastic having electrically conductive material imbedded therein.

10. An improved liquid fuel filter according to claim 7 wherein said open space between each of said first and second housing portions inner and outer wall portions extend within said housing inlet and outlet ends and at least partially within each of said inlet and outlet connector portions.

* * * * *